G. W. Brown.
Blacksmith Swage.

N° 88,125. Patented Mar. 23, 1869.

Witnesses.
Socrates Scholfield.
LeGrand Scholfield.

Inventor.
George W. Brown.

GEORGE W. BROWN, OF PROVIDENCE, RHODE ISLAND, ASSIGNOR TO HIMSELF AND A. T. GIFFORD, OF SAME PLACE.

*Letters Patent No. 88,125, dated March 23, 1869.*

IMPROVEMENT IN BLACKSMITHS' SWAGE.

The Schedule referred to in these Letters Patent and making part of the same.

*To all whom it may concern:*

Be it known that I, GEORGE W. BROWN, of Providence, in the county of Providence, and in the State of Rhode Island, have invented an Improved Blacksmiths' Swage; and do hereby declare that the following is a full and exact description, reference being had to the accompanying drawings, making a part of this specification.

The nature of my invention consists principally in arranging the required forms upon the surface of a cylinder, and also in placing a swage upon trunnions, one of which may be made tapering, for the purpose of forming rings.

To enable those skilled in the art to make and use my invention, I will proceed to describe its construction and operation.

Figure 1:
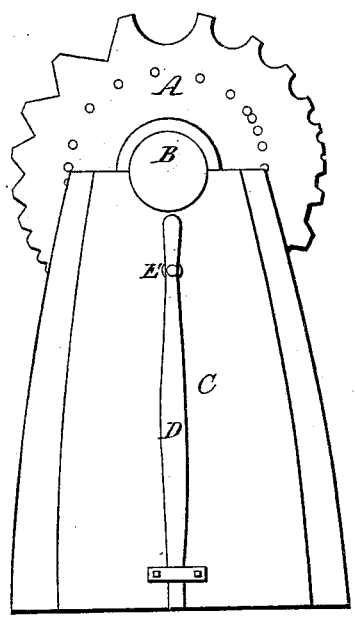
Figure 2:
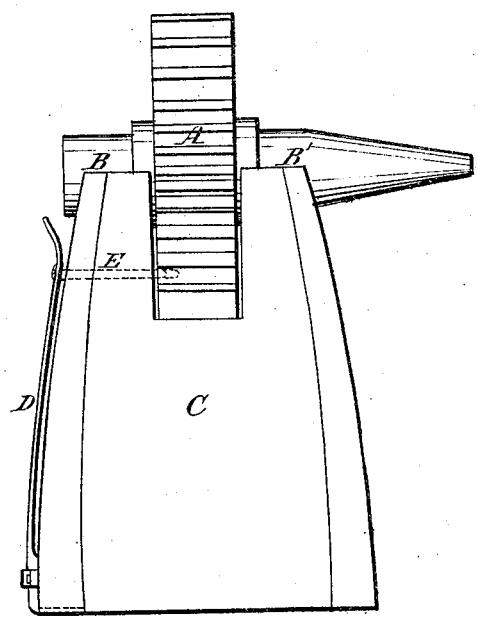
Figure 4:
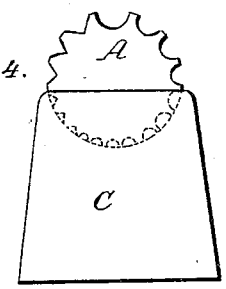
Figure 3:
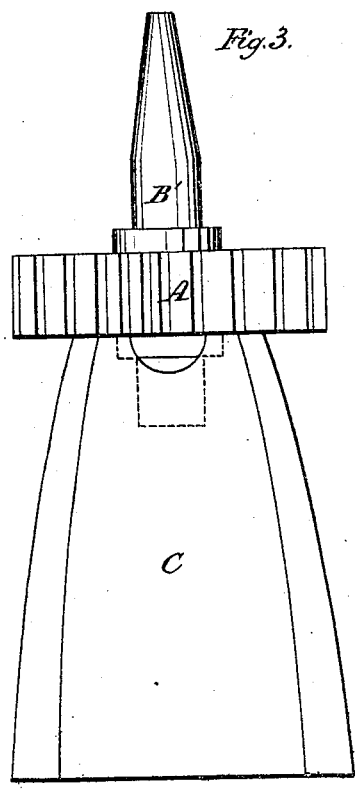

Figure 1 represents a front view.
Figure 2 represents a side view.
Figure 3 represents a view showing the manner of arranging the swage, in order to use the tapering trunnion.
Figure 4 represents a front view of a cylindrical swage without trunnions.

A represents the swage, (in figs. 1 and 2,) the desired forms being cut upon a cylindrical surface, in the direction of the axis of the trunnions B B'.

C is the block, which supports the swage, and

D is a spring, operating a bolt, E, entering the holes represented upon the front of the swage, (in fig. 1,) in order to hold the same firmly at any desired point.

The trunnion B' is tapered, for the purpose of forming rings, &c., the manner of arranging the same for use being shown in fig. 3.

In fig. 4, the swage is let into the block C, as represented, so as to be retained in its place, and at the same time, from the fact that the extremities of the points between the forms are all at the same distance from the centre, it is easily turned in its bed, so as to bring the required form uppermost.

I am aware that a revolving swage may have been used in certain machines for various purposes, having forms cut thereon of similar, or progressive sizes, or shapes. Therefore I make no claim to a circular revolving swage, the circumference of which is only furnished with such similar progressive forms; but

What I claim as my invention, and desire to secure by Letters Patent, is—

A revolving swage, for blacksmiths' use, with an assortment of both curved and angular, or dissimilar grooves cut upon its surface, in the direction of its axis, substantially as described.

Also, a revolving swage, for blacksmiths' use as herein described, when furnished with a tapering trunnion, substantially as specified.

GEO. W. BROWN.

Witnesses:
  SOCRATES SCHOLFIELD,
  A. T. GIFFORD.